United States Patent [19]

Wu

[11] Patent Number: 5,484,870

[45] Date of Patent: Jan. 16, 1996

[54] POLYUREA COMPOSITION SUITABLE FOR A GOLF BALL COVER

[75] Inventor: Shenshen Wu, Dartmouth, Mass.

[73] Assignee: Acushnet Company, Fairhaven, Mass.

[21] Appl. No.: 83,807

[22] Filed: Jun. 28, 1993

[51] Int. Cl.$^6$ .......................... C08G 18/32; C08G 77/26
[52] U.S. Cl. .................... 528/28; 528/33; 528/38; 528/64; 528/80; 273/235 R
[58] Field of Search ..................... 528/61, 59, 62, 528/63, 64, 68, 28, 33, 38; 273/235 R, 220, 230

[56] References Cited

U.S. PATENT DOCUMENTS

| | | | |
|---|---|---|---|
| 4,123,061 | 10/1978 | Dusbiber | 273/220 |
| 4,246,392 | 1/1981 | Koike et al. | 528/64 |
| 4,334,944 | 6/1982 | Creyf | 521/164 |
| 4,625,964 | 12/1986 | Yamada | 273/220 |
| 5,039,775 | 8/1991 | Oyaizu | 528/68 |

FOREIGN PATENT DOCUMENTS

| | | |
|---|---|---|
| 279376 | 8/1988 | European Pat. Off. . |
| 476622 | 1/1992 | European Pat. Off. . |
| 538850 | 4/1993 | European Pat. Off. . |

*Primary Examiner*—Paul R. Michl
*Assistant Examiner*—Mark L. Warzel
*Attorney, Agent, or Firm*—Pennie & Edmonds

[57] ABSTRACT

A novel polyurea composition comprising the reaction product of an organic isocyanate and an organic amine, each having at least two functional groups is disclosed. Golf balls employing covers formed of the polyurea composition also are disclosed.

9 Claims, No Drawings

POLYUREA COMPOSITION SUITABLE FOR A GOLF BALL COVER

FIELD OF THE INVENTION

This invention relates to polyurea compositions, methods for manufacture thereof, and to products formed of those compositions. The invention particularly relates to golf balls which employ covers formed of polyurea compositions.

BACKGROUND OF THE INVENTION

There are only a few materials which are considered suitable for golf ball covers. Balata, a naturally occurring material which can also be made synthetically, was the material of choice until the mid-1960's. Balata was known for its great "click" and "feel". In the 1960's, E.I. du Pont de Nemours & Company came out with a new plastic product, an ionomer which was sold under the name SURLYN®. SURLYN®, however, is hard as compared to balata and many golfers continue to prefer balata because of its "click" and "feel".

The search has continued for a golf ball cover material with the durability of SURLYN® and the "click" and "feel" of balata. Polyurethanes have been considered for quite a few years because they meet the requirements of both durability and good "click" and "feel"; a disadvantage of polyurethanes, however, has been processability.

A need therefore continues to exist for golf ball cover materials which have improved click and feel, as well as improved shear and cut resistance.

SUMMARY OF THE INVENTION

Polyurea compositions comprising the reaction product of an organic isocyanate and an organic amine, each having at least two functional groups are disclosed. Golf balls employing covers formed of those polyurea compositions also are disclosed.

In accordance with the invention, polyureas are produced by reacting an isocyanate and an amine curing agent. The amine curing agent is an organic di-functional amine. Optionally, a tri-functional amine may be employed. Polyureas manufactured by reacting isocyanates and the amine curing agents in accordance with the invention can be processed over a wide temperature range.

The method of the invention entails reacting an amine curing agent and an isocyanate in a mole equivalent ratio sufficient to form a polyurea. The mole equivalent ratio of amine groups to isocyanate groups may vary over a wide range. Preferably, the mole equivalent ratio of amine groups to isocyanate groups is 5.47:1 to 1.55:1, most preferably 2.97:1. Additional materials such as colorants, ultraviolet light absorbers, plasticizers, and the like may be included in the polyurea compositions of the invention.

The polyureas produced in accordance with the invention may be used in a variety of applications such as sealants, adhesives, coatings and molded parts applications. The polyureas also may be used to provide one-piece balls suitable for use as range balls. Preferably, the polyureas are used as cover materials for two and three piece golf balls because of their outstanding durability and shear resistance.

DETAILED DESCRIPTION OF THE INVENTION

The polyureas of the invention are prepared by reacting an organic isocyanate and an organic amine, each having two or more functional groups. Useful isocyanates include aliphatic, arylaliphatic, and aromatic isocyanates which have an isocyanate content of at least, but not limited to 29%, preferably 29–34%. Mixtures of diisocyanates also may be used in the invention.

Aliphatic isocyanates which may be employed include but are not limited to polymethylene diisocyanates such as ethylene diisocyanate; propylene-1,2-diisocyanate; tetramethylene-1,4-diisocyanate; hexamethylene-1,6 diisocyanate; dodecane-1,12-diisocyanate and the like; cycloaliphatic isocyanates such as dicyclohexylmethane diisocyanate; cyclobutane-1,3-diisocyanate; cyclohexane-1,3-and -1,4-diisocyanate and mixtures of these isomers; 1-isocyanato-3, 3,5-trimethyl-5-isocyanatomethylcyclohexane and the like; arylaliphatic diisocyanates such as 1,3-xylene diisocyanate; perchlorinated aryl polyisocyanates; polyphenylpolymethylene polyisocyanates obtained by aniline formaldehyde condensation followed by phosgenation; m and p-isocyanatophenyl-sulphonyl isocyanates and the like.

Aromatic isocyanates which may be used in the invention include 3,3'-dimethyl-4,4'-biphenylene diisocyanate (TODI), toluene-2,4- or 2,6-diisocyanate (TDI) and mixtures of these isomers such as a mixture of 80% 2,4-toluene diisocyanate and 20% 2,6-toluene diisocyanate; phenylene-1,4-diisocyanate; diphenylmethane-2,4'-diisocyanate; diphenylmethane- 4,4'-diisocyanate (MDI); diphenyl ether 4,4'-diisocyanate; naphthylene-1,5-diisocyanate (NDI); p-phenylene diisocyanate (PPDI); p,p'-diphenyl diisocyanate; hexahydrophenylene-1,3-diisocyanate; hexahydrophenylene-1,4-diisocyanate; triphenylmethane- 4,4'4"-triisocyanate; perhydrodiphenylmethane-2,4'-diisocyanate; perhydrodiphenylmethane-4,4'-diisocyanate and the like, preferably MDI. Other isocyanates which may be employed include polyisocyanates having carbodiimide groups; polyisocyanates having allophanate groups; polyisocyanates having isocyanurate groups; polyisocyanates having urea groups; polyisocyanates having acylated urea groups; polyisocyanates having biuret groups; polyisocyanates prepared by telomerization reactions; polyisocyanates having ester groups; reaction products of the above-mentioned isocyanates with acetals; and polyisocyanates containing polymeric fatty acid groups; isophorone diisocyanate and ester diisocyanates of carboxylic acids of the kind described in British patent specification No. 965,474, triisocyanates such as, p,p',p"-triphenyl methane triisocyanate also may be used.

A broad range of amine curing agents may be employed. Choice of amine curing agent will affect the hardness attained in the polyurea product. Typical amine-curing agents include organic diamines and triamines. Aromatic diamines are preferred. Useful amine curing agents include polymethylene-di-p-aminobenzoates, polyethyleneglycol-bis(4-aminobenzoate) and the like. Especially preferred diamines include polymethylene-di-p-aminobenzoates of formula (1)

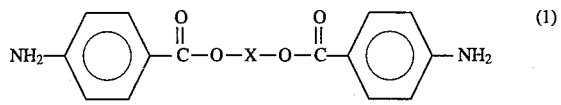

where X=2–12 carbon alkylene or cycloalkylene groups. The alkylene and cycloalkylene groups represented by X may be substituted or unsubstituted. Suitable substituents include 1–5 carbon alkyl groups, halogen, e.g., chloro or fluoro, and aryl groups, preferably phenyl; polyethyleneglycol-bis(4-aminobenzoate) of formula (2) where n=2–4

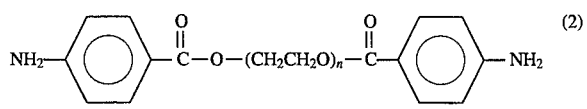

and polydimethylsiloxane-bis(4-aminobenzoate) of formula (3) where n=2–4.

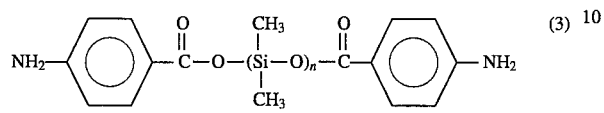

Other useful amine curing agents include:
(A) polytetramethyleneetherglycol-di-p-aminobenzoate of formula (4) where n=1–40

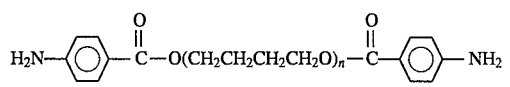

(B) polypropyleneglycol-di-p-aminobenzoate of formula (5) where n=1–20

Tri-amine curing agents which may be employed include N,N,N',N'-tetramethyl-ethylenediamine; 1,4-diazobicyclo(2,2,2)-octane; N-methyl-N'-dimethylaminoethylpiperazine; N,N-dimethylbenzylamine; bis-(N,N-diethylaminoethyl)-adipate; N,N-diethylbenzylamine, pentamethyldiethylenetriamine, N,N-dimethylclyclohexylamine, N,N,N',N'-tetramethyl-1,3-butanediamine, N,N-dimethyl-β-phenylethylamine, 1,2-dimethylimidazole and 2-methylimidazole. Known Mannich bases obtained from secondary amines, such as dimethylamine, and aldehydes, preferably formaldehyde, or ketones, and phenols, such as phenol, nonylphenol or bis-phenol also may be used as catalysts.

The following non-limiting examples will better illustrate the present invention. Parts are by weight unless otherwise indicated.

EXAMPLE 1

The composition of this example is prepared by combining the below listed amounts of isocyanate, white dispersion and violet pigment in a first container, and providing Polamine® 650 in a second container. These containers are heated in a vacuum oven for 30 minutes to a temperature of 150° F. The contents of the containers then are mixed and permitted to react for 90 seconds. The resulting material is cast into a mold heated to 130° F. After gelling to reach a viscosity of 5,000 CSt–13,000 CSt, a wound core is placed into the mold and heated to 150° F. for ten minutes to yield a urea covered golf ball.

| COMPONENT | PARTS BY WEIGHT |
| --- | --- |
| Isonate ® 2143 L[1] | 35.46 |
| Polamine ® 650[2] | 100.00 |
| White Dispersion[3] | 4.83 |
| Violet Pigment[4] | 0.001 |

[1]MDI from Dow Chemical that has an isocyanate content of 29.14%.
[2]Diamine from Air Products and Chemicals Co., equivalent weight = 427.
[3]HCC-15181 colorant from Harwick Chemical. The white dispersion colorant optionally is employed to provide golf balls of a desired color, such as a clean blue-white provided by titanium dioxide.
[4]14-4007 PV-FAST Violet RL Special from Hoechst-Celanese Corporation.

To determine the aforementioned viscosity, the increase in the viscosity of the urea vs. time is measured by a vibrating needle curemeter (VNC) manufactured by Rapra Technology Limited. During curing, a steel needle is suspended in the urea. The needle is vibrated vertically by an electrodynamic vibrator driven by the signal generator of the (VNC). Resistance to movement of the needle is recorded as a voltage output.

Viscosity of urea suitable for introducing a golf ball core into the urea in the mold is between 5,000 CSt-13,000 CSt, corresponding to 80 mV-70 mV voltage output. The time at which this viscosity range occurs is approximately 68 ±4 seconds.

As is known in the art, a compression mold is used to impart a dimple pattern to the cover of the golf ball. The dimpled polyurea covered golf ball can be subjected to standard golf ball finishing operations such as buffing, painting, nameplating and packaging. The hardness of the polyurea cover is given in Table 1.

EXAMPLE 2

Using the procedure of Example 1, the following composition is prepared. The hardness of the polyurea is given in Table 1.

| COMPONENT | PARTS BY WEIGHT |
| --- | --- |
| Isonate ® 2143 L[1] | 67.89 |
| Polamine ® 250[2] | 100.00 |
| White Dispersion[3] | 4.83 |
| Violet Pigment[4] | 0.001 |

[1]MDI from Dow Chemical that has an isocyanate content of 29.14%.
[2]Diamine from Air Products and Chemicals Co., equivalent weight = 224.
[3]HCC-15181 colorant from Harwick Chemical.
[4]14-4007 PV-FAST Violet RL Special from Hoechst-Celanese Corporation.

EXAMPLE 3

Using the procedure of Example 1, the following composition is prepared. The hardness of the polyurea is given in Table 1.

| COMPONENT | PARTS BY WEIGHT |
| --- | --- |
| Isonate ® 2143 L[1] | 28.10 |
| Polamine ® Blend[2] | 100.00 |
| White Dispersion[3] | 4.83 |
| Violet Pigment[4] | 0.001 |

[1]MDI from Dow Chemical that has an isocyanate content of 29.14%.
[2]Diamine blend of .25 equivalent Polamine 650 and .75 equivalent of Polamine 1000, each of which are available from Air Products and Chemicals Co., equivalent weight of blend = 541.
[3]HCC-15181 colorant from Harwick Chemical.
[4]14-4007 PV-FAST Violet RL Special from Hoechst-Celanese Corporation.

EXAMPLE 4

Using the procedure of Example 1, the following composition is prepared. The hardness of the polyurea is given in Table 1.

| COMPONENT | PARTS BY WEIGHT |
|---|---|
| Isonate ® 2143 L[1] | 19.23 |
| Polamine ® Blend[2] | 100.00 |
| White Dispersion[3] | 4.83 |
| Violet Pigment[4] | 0.001 |

[1]MDI from Dow Chemical that has an isocyanate content of 29.14%.
[2]Diamine blend of .50 equivalent of Polamine 2000, .125 equivalent of Polamine 650, and .375 equivalent of Polamine 1000, each of which are available from Air Products and Chemicals Co., equivalent weight of blend = 791.
[3]HCC-15181 colorant from Harwick Chemical
[4]14-4007 PV-FAST Violet RL Special from Hoechst-Celanese Corporation.

Although wound cores are employed in the above examples, it is to be understood that solid cores also may be employed.

Generally, it has been found that as the equivalent weight of the amine curing agent increases, the hardness of the polyurea decreases and the resiliency and velocity of balls which employ covers formed of the resulting polyureas increases. Thus, for a specific isocyanate such as the isocyanate reactant shown in Example 1, the equivalent weight ratio of amine functional groups to isocyanate groups can be changed by varying the amine curing agent as shown in Examples 2–4. The equivalent weight ratios of amine functional groups to isocyanate groups for Examples 1–4, as well as the hardness of the resulting polyureas, are shown in Table 1.

TABLE 1

| EXAMPLE NO. | EQUIVALENT WEIGHT RATIO OF AMINE TO ISOCYANATE | SHORE D HARDNESS |
|---|---|---|
| 1 | 2.97 | 57 |
| 2 | 1.55 | 80 |
| 3 | 3.75 | 50 |
| 4 | 5.47 | 38 |

Useful equivalent weights of the amine curing agents may vary from 224 to 791, preferably 427 to 541, most preferably 427. The hardness of polyureas useful as golf ball covers may vary from 38 to 80, preferably 50 to 57, most preferably 57.

In accordance with the invention, it surprisingly has been found that polyureas can be formed into golf ball covers over a broad temperature range. For example, when the polyureas of the invention are formed into golf balls having polyurea covers by compression molding at a mold temperature of 130° F., the isocyanate and amine curing agents may be heated to 375° F., preferably room temperature to 210° F., most preferably 120°–180° F., prior to reacting with each other to provide polyureas. The time required to react the isocyanate and amine curing agent generally increases as the reaction temperature decreases. Typically, at temperatures of 120°–180° F., the time required to react the isocyanate and amine curing agents is 30–180 seconds.

Molding conditions for manufacture of the polyurea covered golf balls depends on the isocyanate and amine reactants employed. Curing, however, usually is accomplished by employing mold heated to 120°–180° F., preferably 130° F., for at least 10 minutes. Specific times and temperatures readily can be determined by the art skilled. The mold temperature employed, however, should not be so high that the core is damaged. The resulting ball is stored at room temperature for several days to develop its full strength and hardness.

The balls which employ the polyurea compositions of the invention typically have a PGA Compression above 85, preferably above 85–100. The durometer on the Shore D Scale should be at least 48–70. The rebound on the standard 72 inch rebound test should be about 56 inches. On the standard United States Golf Association Driving Machine the initial velocity of the ball should be at least 250 feet/second, preferably 250–255 feet/second. Also, balls which employ covers formed of the polyurea compositions of the invention have much improved shear resistance and cut resistance than conventional golf balls.

As many widely different embodiments of this invention may be made without departing from the spirit and scope thereof, it is to be understood that this invention is not limited to the specific embodiments thereof except as defined in the appended claims.

What is claimed is:

1. A polyurea composition suitable for molding golf ball covers comprising the reaction product of an organic compound having at least two isocyanate functional groups and an amine curing agent selected from the group of polymethylene-di-p-aminobenzoates, polydimethylsiloxane-bis(4-aminobenzoate), polytetramethyleneetherglycol-di-p-aminobenzoate, and polypropylene-glycol-di-p-aminobenzoate, wherein the equivalent weight ratio of amine functional groups to isocyanate functional groups is about 2.97.

2. The polyurea composition of claim 1 further including a colorant.

3. The polyurea composition of claim 1 wherein the organic compound has an isocyanate content of about 29%.

4. The polyurea composition of claim 1 wherein the isocyanate is carbodiimide modified diphenylmethane-4,4'-diisocyanate.

5. The polyurea composition of claim 4 wherein the composition has a Shore D hardness of about 48–70.

6. A polyurea composition suitable for molding golf ball covers comprising the reaction product of an organic compound having at least two isocyanate functional groups and an amine curing agent having at least two amine functional groups wherein the equivalent weight ratio of amine functional groups to isocyanate functional groups is about 2.97.

7. The polyurea composition of claim 6, wherein the organic compound has an isocyanate content of about 29%.

8. The polyurea composition of claim 6 further including a colorant.

9. The polyurea composition of claim 7 wherein the composition has a Shore hardness of about 57.

* * * * *

UNITED STATES PATENT AND TRADEMARK OFFICE
CERTIFICATE OF CORRECTION

PATENT NO. : 5,484,870

DATED : January 16, 1996

INVENTOR(S) : Shensen Wu

It is certified that error appears in the above-identified patent and that said Letters Patent is hereby corrected as shown below:

In claim 5, col. 6, line 47, replace "about 48-70" with --48-70--

Signed and Sealed this

Second Day of July, 1996

*Attest:*

BRUCE LEHMAN

*Attesting Officer*     *Commissioner of Patents and Trademarks*